United States Patent [19]

Brownstein et al.

[11] 4,331,400
[45] May 25, 1982

[54] ELECTRONIC STROBE FLASH APPARATUS FOR AUTOMATIC FILL-IN AND FULL-FLASH

[75] Inventors: Scott A. Brownstein; Carl N. Schauffele, both of Rochester, N.Y.

[73] Assignee: Eastman Kodak Company, Rochester, N.Y.

[21] Appl. No.: 177,146

[22] Filed: Aug. 11, 1980

[51] Int. Cl.³ .............................................. G03B 7/16
[52] U.S. Cl. ...................................... 354/33; 354/27; 354/31
[58] Field of Search ............................. 354/27, 31, 33

[56] References Cited

U.S. PATENT DOCUMENTS

| | | |
|---|---|---|
| 3,591,829 | 7/1971 | Murata et al. |
| 3,779,142 | 12/1973 | Yata et al. |
| 4,023,187 | 5/1977 | Shenk ................................ 354/27 |
| 4,078,240 | 3/1978 | Kaneko et al. .................... 354/33 |
| 4,188,104 | 2/1980 | Uchiyama et al. ................ 354/31 |
| 4,192,587 | 3/1980 | La Rocque et al. .............. 354/27 |

OTHER PUBLICATIONS

"Dual Photosensors for Effecting Flash . . . ", Research Disclosure, Jul. 1979, pp. 360–361.

*Primary Examiner*—Russell E. Adams
*Attorney, Agent, or Firm*—Dennis P. Monteith

[57] ABSTRACT

A quenchable electronic strobe flash unit has a light-responsive integrating circuit for causing the light emitted by a flashtube to be terminated when the integrating circuit senses a predetermined amount of light. A light-level sensing circuit measures the intensity of the ambient light. A threshold-setting circuit, responsive to the sensing circuit, causes the amount of light needed to be sensed by the integrating circuit for terminating the flash in bright ambient light to be, for example, twenty-five percent of the amount of light required to be sensed for terminating the flash in low ambient light. Thus, for subjects within the maximum range of the flash, when ambient light is relatively low, a desired exposure is due primarily to flash light, and when ambient light is relatively high, a selected portion of the desired exposure is attributable to flash light which is, for example, twenty-five percent of the full-flash light output.

5 Claims, 2 Drawing Figures

ELECTRONIC STROBE FLASH APPARATUS FOR AUTOMATIC FILL-IN AND FULL-FLASH

BACKGROUND OF THE INVENTION

1. Field of the Invention

This invention relates generally to photography, and more particularly to an electronic strobe flash apparatus for automatically producing a full flash light output in low ambient light, and a reduced amount of light output for fill-in flash in bright ambient light.

2. Description Relative to the Prior Art

The so-called computer or quenchable electronic strobe flash unit produces a predetermined amount of flash that generally corresponds to a desired exposure. This is commonly called a full flash mode of operation. In this mode, the amount of flash light output is regulated substantially independently of the ambient light intensity.

However, it is desirable to provide flash illumination to soften dark shadows in a scene photographed in bright ambient light. This illumination is commonly called fill-in flash. If bright ambient is not properly taken into account during a flash exposure, a fill-in flash picture can be overexposed. This can be particularly troublesome for a photographic process that uses a film having a narrow "exposure latitude" and which might be used in self-processing cameras.

U.S. Pat. Nos. 4,023,187 and 4,192,587 describe cameras having respectively, a flashlamp and an electronic strobe flash unit, which are fired under conditions of substantially high ambient light intensity to produce fill-in flash exposures. A selected portion of a desired exposure is attributable directly to ambient light while the remaining portion of the exposure is attributable predominately to fill-in flash. In U.S. Pat. No. 4,192,587, it is intended that a selected ratio of ambient to flash exposure light can be achieved from one exposure to the next over a determined range of camera-to-subject distances when the ambient light is above a certain level.

In U.S. Pat. No. 4,192,587 a diaphragm shutter defines a varying progression of exposure apertures, and the strobe flash unit produces a relatively constant amount of flash light. To provide a selected ratio of ambient to flash exposure light, a control system is provided for varying the time at which the strobe is energized during an exposure interval in accordance with subject distance and ambient light intensity. Such apparatus is complex and adds further to the cost of apparatus for controlling a flash exposure.

SUMMARY OF THE INVENTION

According to the present invention, an improved electronic strobe flash apparatus provides proper supplemental illumination for subjects within the maximum range of the flash (1) in a full flash mode of operation under conditions of low ambient light, and (2) in a fill-in flash mode of operation under conditions of bright ambient light. Furthermore, in the fill-in flash mode the apparatus provides for exposures in which the ratio of flash exposure light to ambient exposure light is substantially the same from one exposure to the next.

The electronic strobe flash apparatus has a flashtube for emitting flash light, means including a light-responsive integrating circuit exposable to light for producing a flash terminating signal, and means responsive to the flash terminating signal for terminating the light emission by the flashtube. The flash unit also includes means for measuring the level of ambient light, and means for reducing the amount of light needed to produce the flash terminating signal when the ambient light is above a predetermined level.

The invention and its objects and advantages, will become more apparent in a detailed description of two preferred embodiments presented below.

DESCRIPTION OF THE DRAWING

In a detailed description of a preferred embodiment of the invention presented below, reference is made to the accompanying drawing, in which.

DESCRIPTION OF THE PREFERRED EMBODIMENTS

Because electronic strobe flash apparatus is well known, the present description will be directed in particular to elements forming part of, or cooperating more directly with, apparatus in accordance with the invention. It is to be understood that flash and camera apparatus elements not specifically shown or described may take various forms well known to those having skill in the art.

Figure 1:
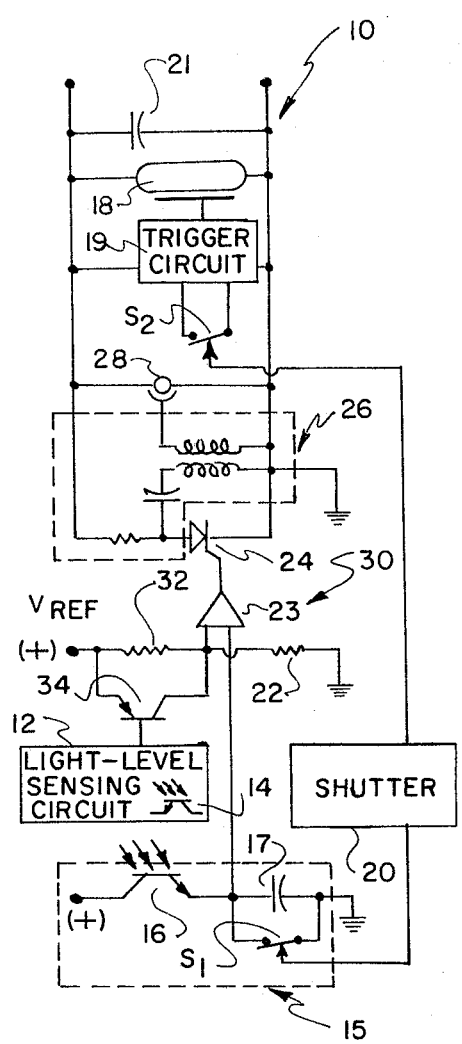
FIG. 1 is a schematic, partially in block diagram form, of a circuit for an electronic strobe flash apparatus according to the invention.

In electronic strobe flash apparatus 10 according to FIG. 1, a light-level sensing circuit 12 includes a photoresponsive element 14 arranged to receive ambient light reflected from a photographic scene. The circuit 12 produces a logic 0 (low level) output signal if the ambient light intensity is low or below a predetermined level, and a logic 1 (high level) output signal if the ambient light intensity is above the predetermined level. The light intensity level above which the circuit 12 provides a logic 1 level signal and below which it provides a logic 0 level signal is preferably about 30 foot lamberts when an exposure is made with a camera (not shown) having an aperture of f/11. Light-level sensing circuits of this type are well known in the photographic art and are disclosed in a variety of patents including the aforementioned U.S. Pat. No. 4,192,587, and U.S. Pat. Nos. 3,860,936 and 3,924,263.

A light-responsive integrating circuit 15 includes a high-speed phototransistor 16, and a timing capacitor 17. The phototransistor 16 is arranged to receive light emitted by a flashtube 18 and reflected from a scene, and produces a current, which is proportional to the intensity of the light impinging upon it. The phototransistor's current charges the capacitor 17, so that the voltage across the capacitor corresponds to the cumulative amount of light sensed by the phototransistor while the capacitor is charging.

A normally closed switch $S_1$, in parallel with capacitor 17, and a normally open switch $S_2$, associated with a flash trigger circuit 19, are arranged to respectively open and close in response to opening movement of a shutter 20 in the camera. When the switch $S_2$ is closed, the circuit 19 triggers the flashtube 18 by means well known in the electronic strobe flash art. In response to the triggering of the flashtube 18, a flash-firing capacitor 21, which is charged by a suitable DC to DC converter (not shown), discharges through the flashtube thereby producing a high-intensity light pulse.

As is well known in the photographic art, the flash light intensity decreases as a function of the square of the distance between the flashtube and the illuminated scene. For a photographic film of average light sensitivity and a camera having an aperture of f/11, the flashtube 18 produces enough light to properly expose subjects within approximately 14 feet of the camera and flash.

When the switch $S_1$ is open, the current produced by the phototransistor 16 charges the capacitor 17. When the voltage across the capacitor 17 equals the voltage across a resistor 22, a comparator 23 produces a logic 1 level output signal.

In response to the comparator's logic 1 level output signal, an SCR 24 is caused to conduct, which causes a trigger circuit 26 to fire a quench tube 28. As is well known in the art, the tube 28 diverts flashtube firing current from the capacitor 21 away from the flashtube 18, thereby interrupting its light emission.

A threshold-setting circuit 30, which includes the resistor 22, a resistor 32 and a PNP transistor 34, is arranged to vary the amount of light required to be sensed by the integrating circuit 15 for causing the quenching of the flashtube 18. The resistor 22 and the resistor 32 form a voltage divider. The voltage across the resistor 22, $V_{R22}$, equals a regulated voltage, $V_{REF}$, less the voltage across the resistor 32, $V_{R32}$.

When the ambient light is bright and is therefore above the aforementioned predetermined level, the logic 1 signal produced by the light-level sensing circuit 12 causes the PNP transistor 34 to be non-conductive. In this case, the voltage $V_{R32}$ equals:

$$V_{REF} \times R_{32}/(R_{22}+R_{32})$$

where $R_{22}$ and $R_{32}$ are respectively the values of the resistances of the resistors 22 and 32.

When the ambient light is low, the logic 0 level signal produced by the light-level sensing circuit 12 causes the transistor 34 to be driven into saturation. In this case, $V_{R32}$ equals the collector-emitter saturation voltage of the transistor 34.

The resistances of the resistors 22 and 32, and the transistor 34, are selected so that the voltage across the resistor 22 in bright ambient light is about one-fourth the voltage across the resistor 22 in low ambient light. Therefore, the integrating circuit 15 is required to sense about one-fourth the light when the ambient light is bright than when the ambient light is low, to cause the quenching of the flashtube 18. Accordingly, for subjects within the maximum range of flash, the flashtube 18 produces one-fourth the light in bright ambient light, for fill-in flash, that it produces in low light, for full flash.

Figure 2:
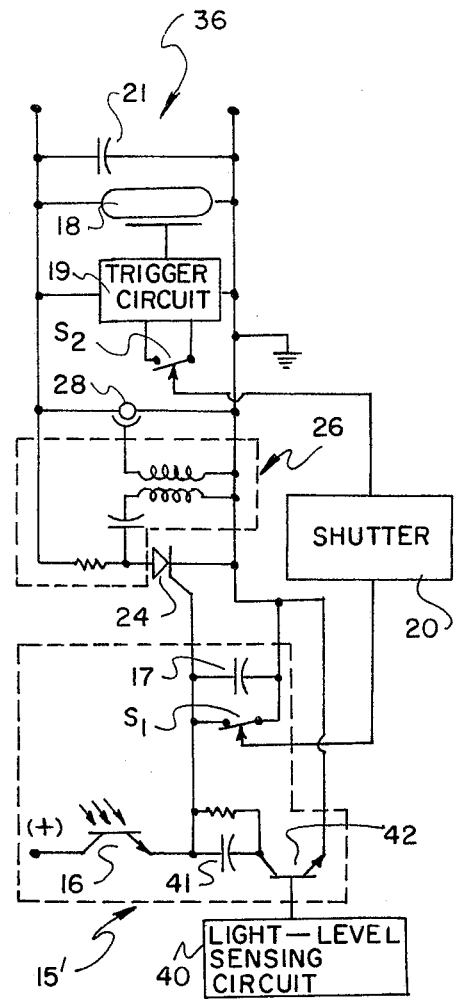
FIG. 2 shows an alternative embodiment of a circuit for an electronic strobe flash apparatus according to the invention.

An alternative preferred embodiment of electronic strobe flash apparatus 36 is shown in FIG. 2, where elements similar to the elements of FIG. 1 are identified by like numerals. A light-level sensing circuit 40 produces a logic 1 output signal if the ambient light intensity is below a predetermined level, and a logic 0 output signal if the ambient light intensity is above the predetermined level. The threshold-setting circuit includes an auxiliary timing capacitor 41, connected in series with the phototransistor 16, and an NPN transistor 42. The base of the transistor 42 is connected to the output of the level-sensing circuit 40, and its collector and emitter are connected respectively to the capacitor 41 and ground.

When ambient light is low, the circuit 40 causes the transistor 42 to conduct. In this case, the current produced by the phototransistor 16 is divided. One portion of the current charges the capacitor 41 and a second portion charges the capacitor 17.

In bright ambient light, the transistor 42 is non-conductive. In this case, the current produced by the phototransistor 16 is blocked from charging the capacitor 41, and charges only the capacitor 17.

In low ambient light, the rate of integration of the integrating circuit 15' is inversely proportional to the sum of both the capacitance of the capacitor 17 and the capacitance of the capacitor 41. In bright ambient light, the rate of integration of the integrating circuit is inversely proportional to only the capacitance of the capacitor 17. Preferably, the ratio $(C_{17}+C_{41})/C_{17}$ is approximately four to one. Accordingly, when the ambient light is low, the cumulative light required to be sensed by the integrating circuit 15' to charge the capacitor 17 to a voltage for quenching the flashtube 18 is four times the cumulative light required to be sensed when the ambient light is bright. The operation of the apparatus of FIG. 2 is similar to that of FIG. 1 in that for subjects within the maximum range of the flash, the flashtube 18 produces fill-in flash, in bright ambient light, that is one-fourth the amount of the full flash produced in low ambient light.

The phototransistor 16 senses light reflected from a scene that can include ambient light. Because the ambient light intensity is normally much lower than the intensity of the electronic flash, and because the duration of the electronic flash is normally no greater than about 1 millisecond, the ambient light would generally have little influence in the regulation of the electronic flash.

However, the flash can be controlled independently of the ambient light by separating the current produced by the phototransistor 16 into two components, i.e. one due to ambient light and the other due to electronic flash. The component corresponding to the ambient would be substantially DC, indicating the intensity of slowly changing ambient, and the component relating to the electronic flash would be AC, indicating the rapidly changing flash. A suitable highpass filter can be employed to remove the DC component from the phototransistor's current so that the flash is regulated independently of the ambient.

Also, a camera having automatic exposure control apparatus can control the camera shutter 20 so that the exposure due to the ambient is independent of the flash. One way this can be accomplished is by delaying the triggering of the flashtube 18 until the exposure control apparatus has produced a signal for commencing the closing of the shutter. In low ambient light, the shutter closing signal can be produced after a predetermined exposure interval. In bright ambient light, the shutter closing signal is produced when the exposure control apparatus has sensed a desired amount of ambient exposure light.

The signal for commencing the closing of the shutter may be used also to trigger the flashtube. Exposure of film by the flash light will be made as the shutter begins to close. In bright ambient light, a selected ratio of ambient exposure light to flash exposure light can be achieved from one exposure to the next in situations where the subject is within the maximum range of the flash.

The invention has been described in detail with particular reference to two preferred embodiments thereof, but it will be understood that variations and modifications can be effected within the spirit and scope of the invention.

What is claimed is:

1. For use in association with a camera having an exposure operation that is controlled in accordance with a desired amount of ambient exposure light reflecting from a photographic subject, an electronic strobe flash apparatus having a flashtube for emitting flash light to provide supplemental illumination for illuminating during an exposure operation a subject that is within the effective flash range of the camera, a light-responsive circuit arranged for measuring flash light and for producing a flash terminating signal upon measuring a first select amount of flash light that has reflected from the subject, and means responsive to the flash terminating signal for terminating light emission by said flashtube, said flash apparatus comprising:
   (a) a light-level sensing circuit arranged for sensing an average ambient light intensity of a scene independently of subject range and for providing a discrete output indicative of whether ambient light intensity is above or below a predetermined level; and
   (b) control means, coupling said sensing circuit and said light-responsive circuit, responsive to the output of said sensing circuit for causing said light-responsive circuit to reduce the first select amount of flash light needed to be measured to produce the flash terminating signal to a second select amount of flash light when the average ambient light intensity is above the predetermined level, to provide a unique fixed ratio between the amounts of flash and ambient exposure light reflected from a subject within the effective flash range for each exposure operation when average ambient light intensity is above the predetermined level, and to provide the first select amount of flash light reflected from such subject for each exposure operation when average ambient light intensity is below the predetermined level.

2. For use in association with a camera having an exposure operation that is controlled in accordance with a desired amount of ambient exposure light reflecting from a photographic subject, an electronic strobe flash apparatus having a flashtube for emitting flash light to provide supplemental illumination for illuminating during an exposure operation a subject that is within the effective flash range of the camera, a light-responsive circuit arranged for measuring flash light and for producing a flash terminating signal when said light-responsive circuit has measured a first select amount of flash light, and means responsive to the flash terminating signal for terminating light emission by said flashtube, said flash apparatus comprising:
   (a) a light-level sensing circuit arranged for sensing an average ambient light intensity of a scene independently of scene range and for providing a discrete output indicative of whether ambient light intensity is above or below a predetermined level; and
   (b) control means, coupling said sensing circuit and said light-responsive circuit, responsive to the discrete output for causing said light-responsive circuit to increase the first select amount of flash light needed to be measured to produce the flash terminating signal to a second select amount of flash light when the average ambient light intensity is below the predetermined level, to provide a unique fixed ratio between the amounts of flash and ambient exposure light reflected from a subject within the effective flash range for each exposure operation when average ambient light intensity is above the predetermined level, and to provide the second select amount of flash light reflected from such subject for each exposure operation when average ambient light intensity is below the predetermined level.

3. For use in association with a camera having an exposure operation that is controlled in accordance with a desired amount of ambient exposure light reflecting from a photographic subject, an electronic strobe flash apparatus having a flashtube for emitting flash light to provide supplemental illumination for illuminating during an exposure operation a subject that is within the effective flash range of the camera, a light-responsive circuit arranged for measuring flash light and for producing a flash terminating signal when said light-responsive circuit has measured a select amount of flash light, and means responsive to the flash terminating signal for terminating the light emission by said flashtube, said flash apparatus comprising:
   (a) light-level sensing means for detecting an average ambient light intensity of a scene independently of scene range and having first and second conditions corresponding respectively to ambient light intensity being above and below a predetermined level; and
   (b) control means, coupling said sensing means and said light-responsive circuit, having (1) a first state in response to said sensing means assuming its first condition for causing said light-responsive circuit to produce the flash terminating signal when a first select level of flash light has been measured, to provide a unique fixed ratio between the amounts of flash and ambient exposure light reflected from a subject within the effective flash range for each exposure operation when average ambient light intensity is above the predetermined level, and (2) a second state in response to said sensing means assuming its second condition for causing said light-responsive circuit to produce the flash terminating signal when a second select level of flash light has been measured which is greater than the first select light level, to provide a fixed amount of flash light reflected from such subject for each exposure operation when average ambient light intensity is below the predetermined level.

4. For use in association with a camera having an exposure operation that is controlled in accordance with a desired amount of ambient exposure light reflecting from a photographic subject, an electronic strobe flash apparatus having a flashtube for emitting flash light to provide supplemental illumination for illuminating during an exposure operation a subject that is within the effective flash range of that camera, a light-responsive signal-integrating circuit exposable to flash light for producing a light-dependent signal and for integrating the light-dependent signal in accordance with a time constant for producing a flash terminating signal when said signal-integrating circuit has been exposed to a first select amount of flash light, and means responsive to the flash terminating signal for terminating light emission by said flashtube, said flash apparatus comprising:
   (a) a light-level sensing circuit for detecting an average ambient light intensity of a scene independently of scene range and for providing an output indicative of whether ambient light intensity is above or below a predetermined level; and (b) control means, including an integrating capacitor, coupling said sensing circuit and said signal-integrating circuit, responsive to the output of said sensing circuit for selectively coupling said integrating capacitor to said signal-integrating circuit to reduce the time constant of said signal-integrating circuit when ambient light intensity is above the predetermined level, to reduce the first select amount of light needed to expose said signal-integrating circuit to produce the flash terminating signal to a second select amount of flash light when the average ambient light intensity is above the predetermined level, to provide a unique fixed ratio between the amounts of flash and ambient exposure light reflected from a subject within the effective flash range for each exposure operation when average ambient light intensity is above the predetermined level, and to provide the first select amount of flash light reflected from such subject for each exposure operation when average ambient light intensity is below the predetermined level.

5. For use in association with a camera having an exposure operation that is controlled in accordance with a desired amount of ambient exposure light reflecting from a photographic subject, an electronic strobe flash apparatus having a flashtube for emitting flash light to provide supplemental illumination for illuminating during an exposure operation a subject that is within the effective flash range of the camera, a light-responsive signal-integrating circuit having at least a portion thereof arranged for measuring flash light and for producing a resultant signal corresponding to the time integral of light measured by said signal-integrating circuit upon measuring a first select amount of flash light, and means responsive to flash terminating signal for terminating light emission by said flashtube, said flash apparatus comprising:

(a) a light-level sensing circuit for detecting an average ambient light intensity of a scene independently of scene range and for providing an output indicative of whether ambient light intensity is above or below a predetermined level;

(b) means for providing a reference signal;

(c) comparator means, coupled to said light-responsive signal-integrating circuit and said reference signal providing means, for producing the flash terminating signal when the resultant signal equals the reference signal; and (d) control means, including a voltage divider coupling said sensing circuit and said comparator means, responsive to the output of said sensing current for causing said voltage divider to reduce the reference signal when average ambient light intensity is above the predetermined level, to reduce the first select amount of flash light needed to expose said signal-integrating circuit to produce the flash terminating signal to a second select amount of flash light when the average ambient light intensity is above the predetermined level, to provide a unique fixed ratio between the amounts of flash and ambient exposure light reflected from a subject within the effective flash range for each exposure operation when average ambient light intensity is above the predetermined level, and to provide the first select amount of flash light reflected from such subject for each exposure operation when average ambient light intensity is below the predetermined level.

* * * * *